(12) United States Patent
Leo et al.

(10) Patent No.: US 11,112,268 B2
(45) Date of Patent: Sep. 7, 2021

(54) ELECTRONIC DEVICE FOR PERFORMING STEP COUNTING WITH FALSE-POSITIVE REJECTION

(71) Applicant: STMicroelectronics S.r.l., Agrate Brianza (IT)

(72) Inventors: Marco Leo, Locate di Triulzi (IT); Alessia Cagidiaco, Pisa (IT); Marco Catellano, Pavia (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 358 days.

(21) Appl. No.: 15/688,152

(22) Filed: Aug. 28, 2017

(65) Prior Publication Data

US 2019/0063948 A1 Feb. 28, 2019

(51) Int. Cl.
*G01C 22/00* (2006.01)
*G06N 5/00* (2006.01)
*G06N 20/00* (2019.01)
*G06F 17/18* (2006.01)

(52) U.S. Cl.
CPC .......... *G01C 22/006* (2013.01); *G06N 5/003* (2013.01); *G06N 20/00* (2019.01); *G06F 17/18* (2013.01)

(58) Field of Classification Search
CPC ...... G01C 22/006; G06F 17/18; G06N 20/00; G06N 5/003
See application file for complete search history.

(56) References Cited

U.S. PATENT DOCUMENTS

| | | | |
|---|---|---|---|
| 2007/0143069 A1* | 6/2007 | Pasolini | G01C 22/006 702/160 |
| 2012/0212288 A1* | 8/2012 | Masui | H03H 11/0427 327/557 |
| 2013/0212058 A1* | 8/2013 | Pattillo | G06N 5/025 706/47 |
| 2015/0127290 A1* | 5/2015 | Plasterer | A61B 5/1118 702/104 |
| 2016/0255017 A1 | 9/2016 | Chowdhary et al. | |
| 2016/0377427 A1* | 12/2016 | Collin | G01C 9/02 702/151 |
| 2018/0190382 A1* | 7/2018 | Ramezani | G06N 5/003 |

OTHER PUBLICATIONS

Holmes et al., WEKA: A Machine Learning Workbench, University of Waikato, Hamilton, New Zealand, 1994 (Year: 1994).*
Diamantaras, Cross-Correlation Neural Network Models, IEEE Transactions on Signal Processing, vol. 42, No. 11, Nov. 1994 (Year: 1994).*

* cited by examiner

*Primary Examiner* — Kyle R Quigley
(74) *Attorney, Agent, or Firm* — Crowe & Dunlevy

(57) ABSTRACT

Disclosed herein is a method including receiving multi-axis accelerometer data representing a potential step taken by a user of an electronic device. The method also includes determining whether the potential step represented by the multi-axis accelerometer data is a false. This determination is made by calculating statistical data from the multi-axis accelerometer data, and applying a decision tree to the statistical data to perform a cross correlation that determines whether the potential step is a false positive. If the potential step is not a false positive, a step detection process is performed to determine whether the potential step is a countable step and, if the potential step is found to be a countable step, a step counter is incremented.

16 Claims, 4 Drawing Sheets

ELECTRONIC DEVICE FOR PERFORMING STEP COUNTING WITH FALSE-POSITIVE REJECTION

TECHNICAL FIELD

This disclosure is directed to the field of portable electronic devices, such as smartphones and wearables, that are capable of counting steps taken by a user. More particularly, this disclosure is related to techniques for use by such electronic devices to reject false positives during step counting to thereby provide for accurate results.

BACKGROUND

Electronic devices, such as smartphones, smartwatches, and other wearables are ubiquitous in the world today. In addition to the variety of communications and entertainment functions that such devices are capable of performing, some are capable of acting as a pedometer so as to track steps taken by a user. This capability may be used by the user to track how many steps they have walked or ran in a given day, or in a given period of time.

Unfortunately, current electronic devices often register false positives when performing pedometer functions. For example, the shaking of the electronic device manually by the user, or involuntarily due to the environment of a user (i.e. riding on a train, driving over bumps in a car), may cause the electronic device to register a step where none was taken. Since such pedometer functions are more useful when their results are accurate and consistent, further development in this area is needed.

SUMMARY

Disclosed herein is a method including receiving multi-axis accelerometer data representing a potential step taken by a user of an electronic device. The method also includes determining whether the potential step represented by the multi-axis accelerometer data is a false. This determination is made by calculating statistical data from the multi-axis accelerometer data, and applying a decision tree to the statistical data to perform a cross correlation that determines whether the potential step is a false positive. If the potential step is not a false positive, a step detection process is performed to determine whether the potential step is a countable step and, if the potential step is found to be a countable step, a step counter is incremented.

The statistical data may include at least one of a mean, a variance, an energy in band, a zero cross count, a maximum, and a minimum of the multi-axis accelerometer data.

The method may also include executing a configuration phase for the electronic device prior to determining whether the potential step represented by the multi-axis accelerometer data is a false positive. The configuration phase may include collecting a plurality of multi-axis accelerometer data for cases where a configuration step taken by the user is a false positive, and for cases where the configuration step taken by the user is an actual step, and updating the decision tree using a cross correlation mechanism.

The cross correlation mechanism may include a machine learning process.

The updated decision tree may be stored onto an application specific integrated processor that performs at least the determination of the false positive as well as the execution of the configuration phase.

A position of the electronic device may be determined from the multi-axis accelerometer data. The decision tree may also be applied to the position of the electronic device.

Performing the step detection process may include determining a magnitude of the multi-axis accelerometer data to produce first intermediate data, filtering the first intermediate data to produce second intermediate data, detecting peaks within the second intermediate data to produce third intermediate data, performing an elaboration on the third intermediate data to produce fourth intermediate data, performing a debouncing step on the fourth intermediate data to determine whether the potential step is a countable step, and incrementing the step counter if the potential step is a countable step.

Performance of the debouncing step may include counting a number of steps registered within a given period of time, and if the number of steps registered is equal to or exceeds a threshold number, then the potential step is a countable step.

The threshold number and the given period of time may be set based upon user input.

Performance of the debouncing step may include counting a number of steps registered, and if the number of steps registered is equal to or exceeds a threshold number, then the potential step is a countable step.

The filtering may include using a second order bandpass filter, where the step detection process is performed using fixed point values.

The filtering may include using a fifth order bandpass filter, where the step detection process is performed using floating point values.

Filter coefficients and filter type of the fifth order bandpass filter may be set based upon user input.

Determination of the magnitude of the multi-axis accelerometer data may include application of coordinate rotation digital computing to the multi-axis accelerometer data.

Performing the elaboration on the third intermediate data may also include setting a starting threshold, an asymptotic threshold, and elaboration coefficients based upon user input.

DETAILED DESCRIPTION

Figure 1:
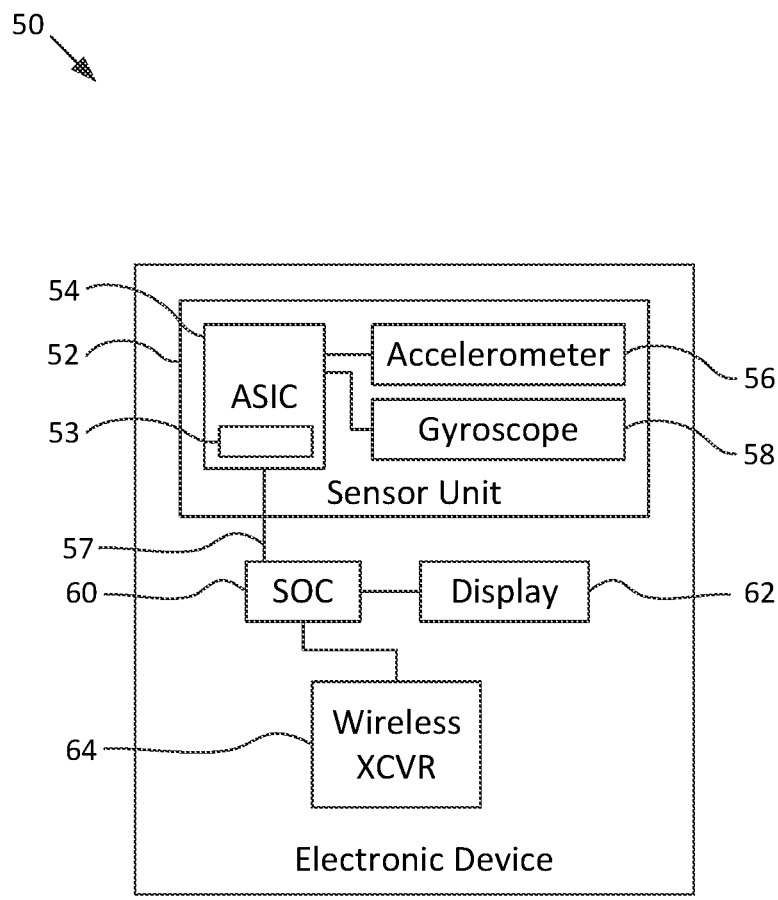
FIG. 1 is a block diagram of an electronic device which may be used to perform the techniques and methods of this disclosure.

The drawing figures and the following description relate to preferred embodiments by way of illustration only. It should be noted that from the following discussion, alternative embodiments of the structures and methods disclosed herein will be readily recognized as viable alternatives that may be employed without departing from the principles of the embodiments.

Reference will now be made in detail to several embodiments, examples of which are illustrated in the accompanying figures. It is noted that wherever practicable, similar or like reference numbers may be used in the figures and may indicate similar or like functionality. The figures depict embodiments for purposes of illustration only.

Referring initially to FIG. 1, an electronic device 50 which may be used to perform the methods and techniques of this disclosure is now described. The electronic device 50 may be a smartphone, smartwatch, fitness tracker, or other wearable or carryable electronic device. The electronic device 50 includes a sensor unit 52 that includes an accelerometer 56 and gyroscope 58 coupled to an application specific integrated circuit (ASIC) 54. The ASIC 54 includes a memory 53. The accelerometer 56 and gyroscope 58 may be micro-electromechanical (MEMS) devices in some applications, and may provide 3-axis data. The sensor unit 52 is coupled to a system on a chip (SOC) 60 via conductive traces (one such conductive trace 57 is shown for simplicity). A display 62 and wireless transceiver 64 are also coupled to the SOC. The display 62 may be a touch sensitive display, and the wireless transceiver 64 may be a cellular data transceiver, a bluetooth data transceiver, a wife data transceiver, or any suitable type of wireless data transceiver. In addition, the wireless transceiver 64 may actually include multiple different wireless transceivers 64 so as to permit wireless communications using different signals and different standards.

In operation, the ASIC 54 receives data from the accelerometer 56 and gyroscope 58, and is specially programmed and purposed to process that data to provide a step count to the SOC 60. Thus, it should be understood that the sensor unit 52 is a single package, and performs the pedometer function using its ASIC 54, and not the SOC 60.

Further details of configurable sensors on which the techniques and methods described herein may be performed can be found in U.S. Pat. App. 2016/0255017, entitled RECONFIGURABLE SENSOR UNIT FOR ELECTRONIC DEVICE, filed Sep. 1, 2016, the contents of which are hereby incorporated by reference in their entirety.

Figure 2:
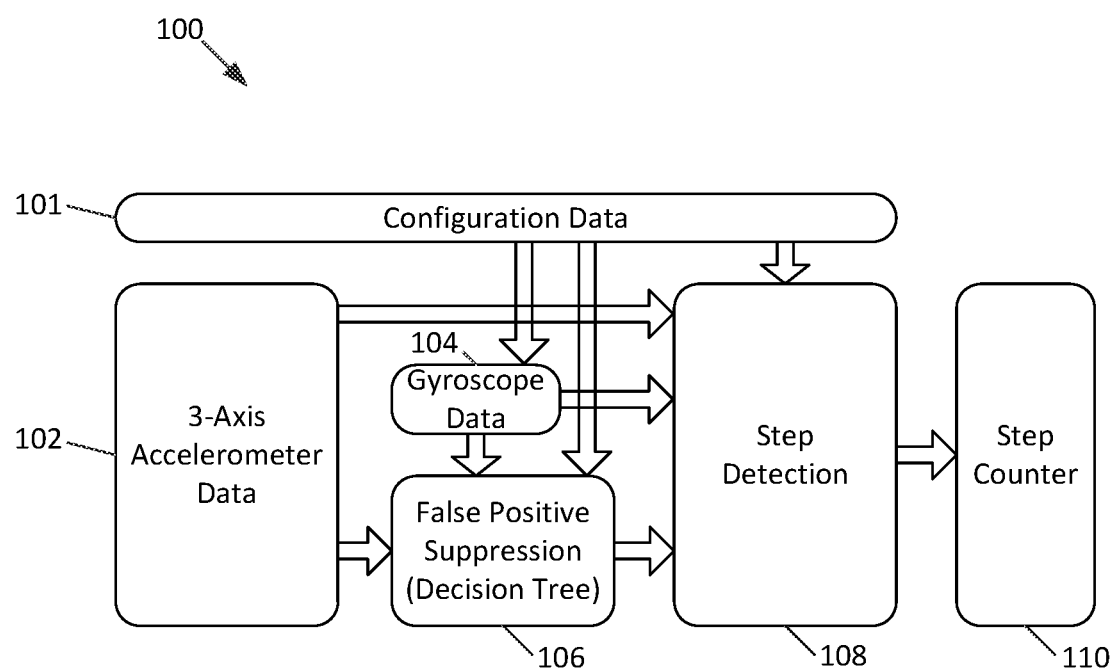
FIG. 2 is a flowchart of a technique for operating the electronic device of FIG. 1 in a pedometer mode.

With additional reference to flowchart 100 of FIG. 2, a technique for operating the electronic device 50 of FIG. 1 in a pedometer mode, in accordance with this disclosure, is now described. In a pedometer mode of operation, the accelerometer 56 generates 3-axis accelerometer data (Block 102) and sends it to the ASIC 54. Likewise, the gyroscope 58 generates 3-axis gyroscope data (Block 104) and sends it to the ASIC 54. The ASIC 54 then calculates statistical data from the 3-axis accelerometer data and the 3-axis gyroscope data, and performs false positive suppression (Block 106) on that data (either the 3-axis accelerometer data, the 3-axis gyroscope data, or a combination of both) using a decision tree stored in its memory 53. The statistical data calculated, and fed as input to the decision tree, may be one or more of a mean, a variance, an energy in band, a zero cross count, a maximum, and a minimum of the 3-axis accelerometer data and 3-axis gyroscope data.

The false positive suppression serves to generate a flag or indication when the decision tree reaches the conclusion that the statistical data represents an event that could be interpreted as a step, such as a shake of the electronic device 50 due to the motion of a train, yet should not be so interpreted since no step was actually taken. If a false positive was found, further steps are not taken, and the ASIC 54 returns to receiving the 3-axis accelerometer data and gyroscope data 104. If a false positive was not found, then the ASIC 54 proceeds with step detection (Block 108) and incrementing a step counter (Block 110) based upon the step detection.

Figure 3:
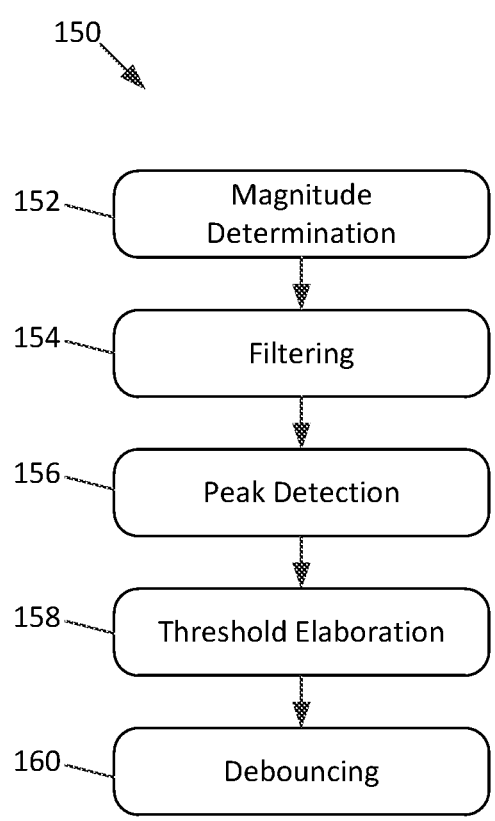
FIG. 3 is a flowchart showing more details of the step detection block of FIG. 2.

Details of the step detection is now described with reference to flowchart 150 of FIG. 3. The step detection includes determining the magnitude of the 3-axis accelerometer data (Block 152). This may be done using a fixed point operation, for example using a coordinate rotation digital computing (CORDIC) calculation, or may be done using a floating point calculation. This magnitude determination may be configurable. For example, when a floating point calculation is performed, user input may result in different mantissa and exponential settings of the magnitude determination, allowing a tradeoff between precision and computing power used in the calculation.

Thereafter, filtering is performed on the data after magnitude determination (Block 154). Where a fixed point operation was used to determine the magnitude, a second order filter, such as on the order of a 1-3 Hz bandpass filter, may be used. Where a floating point operation was used to determine the magnitude, a fifth order filter may be used. These filters may be configurable, but it should be noted that the filter used for fixed point operation is of a lesser order than the floating point operation, which may help reduce demand on the ASIC 54. The configuration may be of tap coefficients that vary the frequency band and gain of the filter, or may be of a filter type in general (e.g. symmetric, antisymmetric), and this configuration may be performed via user input.

Next, peak detection is performed on the data (Block 156), and then a threshold elaboration (Block 158) is performed. The threshold elaboration may switch between different asymptotic thresholds based upon recognized user characteristics or conditions in the data—for example, a tall user may have a substantially different gait than a short user, etc. The asymptotic thresholds may be settable by user input. In addition, a starting threshold, a minimum threshold, and different coefficients may also be settable by user input.

Thereafter, a debouncing step is performed (Block 160). The debouncing step includes counting a number of steps registered, and if the number of steps registered is equal to or exceeds a threshold number, then the potential step is a countable step. Thus, for example, the threshold may be seven steps, such that after the seventh consecutive step taken, counting of steps begins from there, or accounts for the previous steps taken. The threshold may be during a given period of time in some cases. For example, the threshold may be seven steps within 20 seconds. It should be understood that any number of steps may be used as the threshold number, as may any amount of given time, and that both may be settable by user input.

Figure 4:
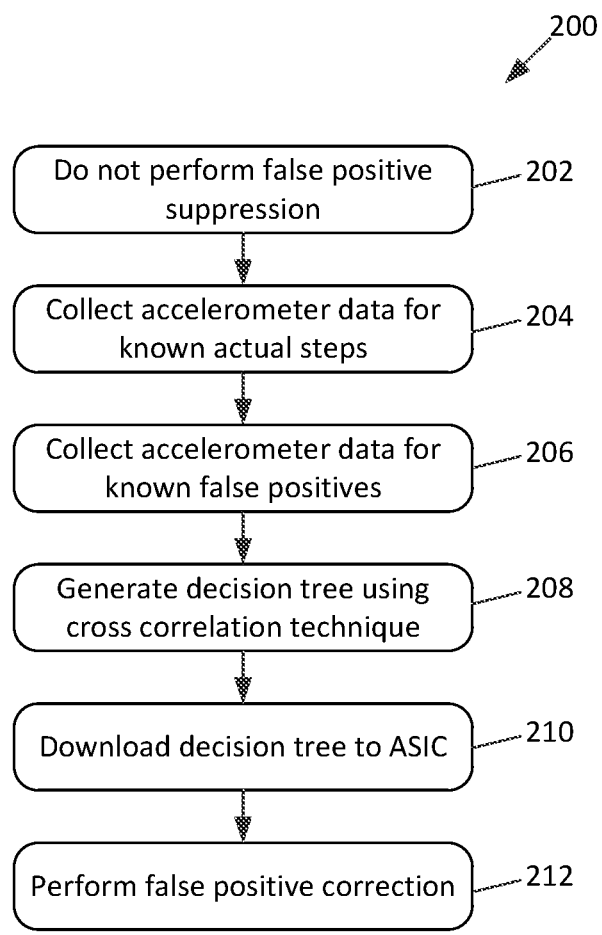
FIG. 4 is a flowchart showing a calibration process that may be performed prior to, or during a break in, the step detection of FIG. 2.

With further reference to flowchart 200 of FIG. 4, the generation of the decision tree for the false position detection is described. In some cases, the memory 53 of the ASIC 54 may be pre-loaded with a generic decision tree, which may then be updated during a configuration process. In other cases, the memory 53 of the ASIC 54 may not have the generic decision tree pre-loaded therein, and the decision tree may instead be generated from scratch during the configuration process.

The configuration process starts with the ASIC 54 not currently performing false positive suppression (Block 202). Then, the ASIC 54 collects data from the accelerometer 56 and gyroscope 58 for known actual steps (Block 204), as well as for known false positives (Block 206). Then, a cross-correlation tool, such as the Waikato Environment for Knowledge Analysis (WEKA) tool, is used to generate or update the decision tree (Block 208), which is then loaded into the memory 53 of the ASIC 54 (Block 210). The ASIC 54 thereafter proceeds with false positive correction.

The configuration of storage of the decision tree into the memory 53 of the ASIC 54 is as follows. The decision tree may be stored such that each row of the memory contains all information for a given node of the decision tree. For example, an operation type (e.g. greater than, less than, etc), a node type, an address (or result) if the operation is performed and returns as true, an address (or result) of the operation is performed and returns as false, and a threshold for comparison.

Upon reading this disclosure, those of ordinary skill in the art will appreciate still additional alternative structural and functional designs through the disclosed principles of the embodiments. Thus, while particular embodiments and applications have been illustrated and described, it is to be understood that the embodiments are not limited to the precise construction and components disclosed herein and that various modifications, changes and variations which will be apparent to those skilled in the art may be made in the arrangement, operation and details of the method and apparatus disclosed herein without departing from the spirit and scope as defined in the appended claims.

The invention claimed is:

1. A method, comprising:
receiving multi-axis accelerometer data and gyroscope data representing a potential step taken by a user of an electronic device;
determining whether the potential step represented by the multi-axis accelerometer data and the gyroscope data is a false positive by
calculating statistical data from the multi-axis accelerometer data and the gyroscope data; and
applying a decision tree to the statistical data to determine whether the potential step is a false positive; and
if the potential step is not a false positive, performing a step detection process to determine from the multi-axis accelerometer data whether the potential step is a countable step and, if so, incrementing a step counter;
wherein performing the step detection process comprises:
determining a magnitude of the multi-axis accelerometer data to produce first intermediate data;
filtering the first intermediate data using a bandpass filter to produce second intermediate data;
detecting peaks within the second intermediate data to produce third intermediate data;
performing an elaboration on the third intermediate data to produce fourth intermediate data;
performing a debouncing operation on the fourth intermediate data to determine whether the potential step is a countable step; and
incrementing the step counter if the potential step is a countable step;
wherein performance of the debouncing operation step includes counting a number of steps registered, and if the number of steps registered is equal to or exceeds a minimum count threshold number, then the potential step is a countable step, such that the step counter is equal to a total number of countable steps, excluding potential steps falling below the minimum count threshold number.

2. The method of claim 1, wherein the statistical data comprises at least one of a mean, a variance, an energy in band, a zero cross count, a maximum, and a minimum of the multi-axis accelerometer data.

3. The method of claim 1, further comprising:
executing a configuration phase for the electronic device prior to determining whether the potential step represented by the multi-axis accelerometer data and the gyroscope data is a false positive, wherein the configuration phase comprises:
collecting a plurality of multi-axis accelerometer data and gyroscope data for cases where a configuration step taken by the user is a false positive, and for cases where the configuration step taken by the user is an actual step; and
updating the decision tree.

4. The method of claim 3, wherein the decision tree is updated using a machine learning process.

5. The method of claim 3, further comprising storing the updated decision tree onto an application specific integrated processor that performs at least the determination of the false positive as well as the execution of the configuration phase.

6. The method of claim 1, further comprising determining a position of the electronic device from the multi-axis accelerometer data and the gyroscope data; and wherein the decision tree is also applied to the position of the electronic device.

7. The method of claim 1, further comprising setting the threshold number and the given period of time based upon user input.

8. The method of claim 1, wherein the filtering includes using a second order bandpass filter, where the step detection process is performed using fixed point values.

9. The method of claim 1, wherein the filtering includes using a fifth order bandpass filter, where the step detection process is performed using floating point values.

10. The method of claim 9, further comprising setting filter coefficients and filter type of the fifth order bandpass filter based upon user input.

11. The method of claim 1, wherein determination of the magnitude of the multi-axis accelerometer data includes application of coordinate rotation digital computing to the multi-axis accelerometer data.

12. A method of counting steps taken by a user of an electronic device, the method comprising:
performing a calibration process comprising:
collecting a plurality of accelerometer data and gyroscope data for cases where a configuration step taken by the user is known to be a false positive, and for cases where the configuration step taken by the user is known to be an actual step; and
forming a decision tree to determine whether a potential step taken by the user is an actual step;
receiving accelerometer data and gyroscope data representing a potential step taken by the user of the electronic device;
determining whether the potential step represented by the accelerometer data and the gyroscope data is a false positive by
calculating statistical data from the accelerometer data and the gyroscope data; and
applying the decision tree to the statistical data to determine whether the potential step is a false positive; and
if the potential step is not a false positive, performing a step detection process to determine from the accelerometer data whether the potential step is a countable step by:
determining a magnitude of the accelerometer data to produce first intermediate data;
filtering the first intermediate data using a bandpass filter to produce second intermediate data;

detecting peaks within the second intermediate data to produce third intermediate data;

performing an elaboration on the third intermediate data to produce fourth intermediate data;

performing a debouncing operation on the fourth intermediate data to determine whether the potential step is a countable step; and incrementing a step counter if the potential step is a countable step;

wherein performing the debouncing operation step includes counting a number of steps registered, and if the number of steps registered is equal to or exceeds a minimum count threshold number, then the potential step is a countable step, such that the step counter is equal to a total number of countable steps, excluding potential steps falling below the minimum count threshold number.

13. The method of claim 12, wherein the decision tree is formed using a machine learning process.

14. The method of claim 12, wherein the filtering includes using a second order bandpass filter, where the step detection process is performed using fixed point values.

15. The method of claim 12, wherein the filtering includes using a fifth order bandpass filter, where the step detection process is performed using floating point values.

16. The method of claim 12, wherein determination of the magnitude of the multi-axis accelerometer data includes application of coordinate rotation digital computing to the multi-axis accelerometer data.

* * * * *